United States Patent
Hansmann et al.

(10) Patent No.: US 11,020,689 B2
(45) Date of Patent: Jun. 1, 2021

(54) FILTER ELEMENT WITH IMPROVED TESTABILITY AFTER DRY STEAMING

(71) Applicant: Sartorius Stedim Biotech GmbH, Goettingen (DE)

(72) Inventors: Bjoern Hansmann, Goettingen (DE); Volkmar Thom, Goettingen (DE); Thomas Loewe, Goettingen (DE)

(73) Assignee: Sartorius Stedim Biotech GmbH

( * ) Notice: Subject to any disclaimer, the term of this patent is extended or adjusted under 35 U.S.C. 154(b) by 379 days.

(21) Appl. No.: 14/388,846

(22) PCT Filed: Mar. 16, 2013

(86) PCT No.: PCT/EP2013/000811
§ 371 (c)(1),
(2) Date: Sep. 29, 2014

(87) PCT Pub. No.: WO2013/159855
PCT Pub. Date: Oct. 31, 2013

(65) Prior Publication Data
US 2015/0041386 A1 Feb. 12, 2015

(30) Foreign Application Priority Data

Apr. 27, 2012 (DE) .................... 10 2012 008 471.4

(51) Int. Cl.
*B01D 29/13* (2006.01)
*B29K 81/00* (2006.01)
(Continued)

(52) U.S. Cl.
CPC ............ *B01D 29/111* (2013.01); *B01D 29/13* (2013.01); *B01D 65/003* (2013.01);
(Continued)

(58) Field of Classification Search
None
See application file for complete search history.

(56) References Cited

U.S. PATENT DOCUMENTS 2,732,031 A   1/1956   Rabbitt et al.
3,013,667 A   12/1961  Jackson et al.
(Continued)

FOREIGN PATENT DOCUMENTS

DE   2128316   12/1972
DE   3925511    8/1990
(Continued)

OTHER PUBLICATIONS

Polymer Chemistry Innovations, Inc., Aquzol (2010), available at http://www.polychemistry.com/ aquazol/.*
(Continued)

*Primary Examiner* — Krishnan S Menon
*Assistant Examiner* — Brad Gordon
(74) *Attorney, Agent, or Firm* — Gerald E. Hespos; Michael J. Porco; Matthew T. Hespos

(57) ABSTRACT

The present invention relates to a melt-joined filter element with improved testability after dry steaming or alternatively after sterilization by irradiation, to a method for producing the filter element according to the invention, and to the use of the filter element for filtering solutions.

4 Claims, 1 Drawing Sheet

(51) Int. Cl.

| | | |
|---|---|---|
| *B29K 105/00* | (2006.01) | |
| *B29K 105/04* | (2006.01) | |
| *B29L 31/14* | (2006.01) | |
| *B01D 29/11* | (2006.01) | |
| *B01D 65/00* | (2006.01) | |
| *B01D 67/00* | (2006.01) | |
| *B01D 65/02* | (2006.01) | |
| *B01D 69/02* | (2006.01) | |
| *B29C 65/02* | (2006.01) | |

(52) U.S. Cl.
CPC ......... *B01D 65/022* (2013.01); *B01D 67/009* (2013.01); *B01D 67/0088* (2013.01); *B01D 67/0093* (2013.01); *B01D 69/02* (2013.01); *B29C 65/02* (2013.01); *B01D 2323/02* (2013.01); *B01D 2323/30* (2013.01); *B01D 2325/22* (2013.01); *B01D 2325/36* (2013.01); *B29K 2081/06* (2013.01); *B29K 2105/0067* (2013.01); *B29K 2105/04* (2013.01); *B29L 2031/14* (2013.01); *Y10T 156/10* (2015.01)

(56) References Cited

U.S. PATENT DOCUMENTS

| | | | |
|---|---|---|---|
| 3,457,339 | A | 7/1969 | Pall et al. |
| 3,850,813 | A | 11/1974 | Pall et al. |
| 4,078,036 | A | 3/1978 | Keefer |
| 4,392,958 | A | 7/1983 | Ganzi et al. |
| 4,512,892 | A | 4/1985 | Ganzi et al. |
| 4,618,533 | A | 10/1986 | Steuck |
| 4,663,041 | A | 5/1987 | Miyagi et al. |
| 4,720,343 | A | 1/1988 | Walch et al. |
| 4,774,132 | A | 9/1988 | Joffee et al. |
| 4,855,163 | A | 8/1989 | Joffee et al. |
| 4,956,089 | A | 9/1990 | Hurst |
| 5,009,824 | A | 4/1991 | Walch et al. |
| 5,114,508 | A | 5/1992 | Miyagi et al. |
| 5,376,274 | A | 12/1994 | Muller et al. |
| 5,846,421 | A | 12/1998 | Ohtani |
| 6,045,600 | A | 4/2000 | Michaelis et al. |
| 6,159,369 | A | 12/2000 | Strohm et al. |
| 6,186,341 | B1 * | 2/2001 | Konstantin .......... B01D 63/061 |
| | | | 210/488 |
| 6,723,270 | B1 | 4/2004 | Sugiyama et al. |
| 7,273,550 | B2 | 9/2007 | Gutman et al. |
| 2004/0134851 | A1 | 7/2004 | Lucas et al. |
| 2011/0244215 | A1 * | 10/2011 | Thom ................. B01D 67/0093 |
| | | | 428/304.4 |

FOREIGN PATENT DOCUMENTS

| | | | |
|---|---|---|---|
| DE | 4338438 | 5/1994 | |
| DE | 19832658 | 11/1999 | |
| EP | 0096306 | 12/1983 | |
| EP | 0096306 A2 * | 12/1983 | ............ B01D 71/56 |
| EP | 0213930 | 3/1987 | |
| EP | 0228072 | 8/1991 | |
| EP | 0452592 | 4/1995 | |
| EP | 0922476 | 6/1999 | |
| EP | 1479729 | 11/2001 | |
| EP | 2279782 | 12/2004 | |
| GB | 1151592 | 5/1969 | |
| GB | 1327382 | 8/1973 | |
| GB | 1511904 | 5/1978 | |
| GB | 2272843 | 6/1994 | |
| JP | WO 2005115595 A1 * | 12/2005 | ........... B01D 63/061 |
| WO | 1997019743 | 6/1997 | |
| WO | 2000004984 | 2/2000 | |
| WO | WO-0004984 A1 * | 2/2000 | ........... B01D 65/003 |
| WO | 2000044485 | 8/2000 | |
| WO | 2001008781 | 2/2001 | |
| WO | 2001087456 | 11/2001 | |
| WO | WO-2010081511 A1 * | 7/2010 | ......... B01D 67/0093 |

OTHER PUBLICATIONS

Abe, A. and Bloch, D.R.; Polymer Handbook; 1999; pp. ix, 2-12; John Wiley & Sons, Inc; New York.

Woebcken, Wilbrand; Saechtling Kunststoff Taschenbuch; 1992; pp. X-XV.

English Translation of International Preliminary report on patentability (Chapter I) for PCT/EP2013/000811.

* cited by examiner

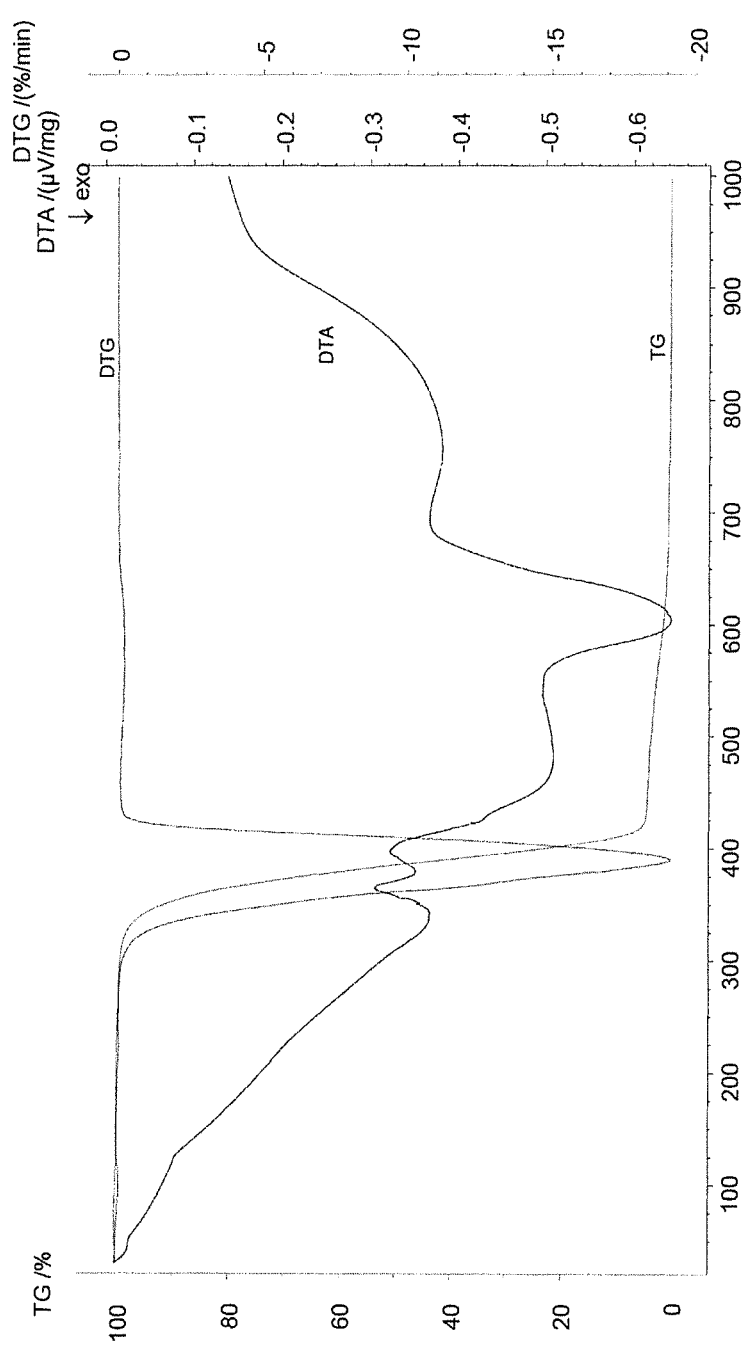

FILTER ELEMENT WITH IMPROVED TESTABILITY AFTER DRY STEAMING

BACKGROUND

1. Field of the Invention

The present invention relates to a melt-joined filter element, for example in the form of a filter cartridge, with improved testability after dry steaming or alternatively after sterilization by irradiation, to a method for producing the filter element according to the invention, and to the use of the filter element for filtering solutions.

2. Description of the Related Art

Filter elements, for example for use in pharmaceutical production, are generally membranes that are encased in plastics housings or plastics inserts and through which there flow liquid media for filtration (see, for example, EP 0 096 306 A2). A typical structural form is flat plastics holders to which flat polymer membranes are bonded in a non-detachable manner by "thermal joining", that is to say by melting the polymer materials and joining the molten zones. However, the achievable membrane area for this structural form is small and generally suitable only for the laboratory scale or relatively small-scale processes.

For use in large-scale processes there have become established further structural forms in the form of membranes in strips which are pleated, that is to say folded, and bonded together at both ends of the membrane strip to form a cylindrical ring. This cylindrical ring of the pleated membrane is open at both end faces. It is necessary both to bond the two ends of the membrane strip together and to seal the two resulting end faces of the pleated membrane strip or bond them to a housing. To that end, the membranes and/or the housing materials are generally converted directly into a polymer melt in the desired joining region on one or both sides by heating. The polymer melt is at least semi-liquid, as a result of which both sides of the bond to be joined can be joined by applying pressure. After the polymer melt has cooled, a stable bond is then formed (see, for example, U.S. Pat. No. 3,457,339).

In particular cases it is not possible to convert both sides of a bond that is to be joined into the molten state. This can be the case in particular for membranes if their structure and form in the molten state are so changed that a desired function no longer exists after the joining process. In such cases, the housing component can be converted into polymer melt on one side in the joining region. Upon joining, the cold membrane is in this case introduced into the hot polymer melt of the housing component. Such joining is likewise sufficiently stable if the joining is designed correctly in terms of construction and a sufficient amount of polymer melt is produced on the housing component.

Regardless of the structural form, membranes that are bonded to the filter element by a melt joining process are subject to a thermal load in the region of the melt join. This thermal load is dependent on structural factors, but in particular on the melting point of the plastics material to which the membrane is to be joined. It has been shown that membranes that are hydrophilic per se or that have been hydrophilized can be damaged by this thermal load upon joining, which results in a change to the membrane properties which in some cases leads to an impairment of the wettability in the region of the join and thus of the testability of the filter elements. This is the case in particular when the filter element is exposed to further thermal loads, such as, for example, by steaming or, more markedly, by dry steaming.

Filter elements within the meaning of this invention have the function of achieving the separation of substances on the basis of size exclusion. This also includes the depletion of yeast cells or bacteria (sterile filtration), viruses (virus depletion), protein aggregates or other particulate contaminants. Filter elements perform this function by the use of membranes through which the solution is passed on the basis of a pressure gradient.

In the mentioned processes, filter elements are generally tested for their integrity before and/or after filtration. With the aid of an integrity test, a suitable measuring method is used to measure whether the required pore size of the membrane has not been exceeded and also whether there are any mechanical defects in the membrane, in the sealing thereof with respect to the filter housing, or in the gas-tight filter housing. The passing of an integrity test indicates that the filter element is in good working order. The common method for the integrity test is the bubblepoint test and/or the gas diffusion test for filter elements wetted with water (DIN 58356-2:08/2000, DIN 58355-2). For a positive test result, it must be ensured that the membrane is wetted with water over its entire surface and thickness. Unwetted surfaces of the membrane lead to convective air currents, which result in a lowered bubblepoint or increased gas diffusion. This has the result that an integrity test is not passed in this case, even though the filter element, had it been completely or sufficiently wetted, would have passed the integrity test and would exhibit the expected separation of substances, provided the membrane and the bonding thereof into the filter element are otherwise defect-free, that is to say do not exhibit pores/faults that do not perform the desired separation of substances by size exclusion.

A further requirement of filter elements that are used for the above-mentioned processes is their ability to be sterilized by means of steam. To that end, for a period of from 15 to 90 minutes, the filter elements are conventionally steamed, that is to say steam at temperatures of up to 140° C. is passed through them, or are autoclaved, that is to say the filter element is exposed to steam at temperatures of up to 140° C. in a separate step prior to use to ensure that the unit is sterilized completely before it is used. This steaming of the filter elements represents a high thermal load for the filter elements. The higher the chosen steam temperature, the higher the loads to which the filter element is subjected by this step. At the same time, steaming sterilizes the filter element all the more effectively, the higher the chosen steaming temperature. It is therefore in the interests of the users of these filter elements to steam the filter elements at as high a temperature as possible in order to achieve sterilization that is as extensive as possible in as short a time as possible. In Wallhäusser, K. H., "Praxis der Sterilisation, Desinfektion, Konservierung, Keimidentifizierung, Betriebshygiene", Georg Thieme Verlag, Stuttgart 1984, for example, steaming and autoclaving at from 134° C. to 140° C. for 30 minutes are described representatively.

A further requirement is that this steaming of the filter elements for the purpose of sterilization can be carried out without previous wetting/rinsing of the filter elements, that is to say the filter elements can be "dry steamed" and then, after minimal rinsing, an integrity test can be performed. The possibility of dry steaming makes a preceding rinsing step of the filter element unnecessary. Because the outlay in terms of time and material required for the rinsing step can be saved, it is of interest to provide filter elements that can be dry steamed.

If sterilization by steaming is preceded by a rinsing step, this whole process is also referred to as "wet steaming". Membranes contained in the filter element are wetted with water. It has been shown that dry steaming represents a higher thermal load for the filter element than does wet steaming. It is supposed that, on account of the evaporation cooling and the heat capacity of the water introduced in the wetting step, "wet steaming" is a step which subjects the filter elements to less of a thermal load than does the alternative "dry steaming".

A further requirement is that the filter element does not change in terms of its properties and its testability as a result of the dry steaming. After sterilization of the filter elements by means of steam, they are rinsed to prepare them for the integrity test. In order to save time and wetting liquid, it is desirable that the complete wetting of the filter element that is necessary for a successful integrity test is possible with a minimal amount of wetting liquid (<1 liter of water/m2), with a minimal differential pressure (<0.1 bar) and in a minimal time (<120 seconds).

In many filter elements known from the prior art, the testability of melt-joined filter elements after dry steaming is ensured only with a considerable outlay in terms of rinsing.

Filter elements known from the prior art that can successfully be tested for integrity with a minimal outlay in terms of rinsing after dry steaming have one or more of the following characteristics:

(1) Discolorations (oxidation) of the membrane by the dry steaming.

(2) The membranes themselves are so modified in the joining region that they become gas-tight, for example by melting, filling or compression of the membrane.

(3) Auxiliary materials, such as, for example, strips of plastics film, are introduced in the joining region in order to render the membrane gas-tight and to improve the bond between the filter element and the membrane while at the same time minimizing the thermal load on the membrane in the region of the melt join.

(4) The membrane surface is so modified in the joining region that it has sufficient wettability with water after the melt joining process.

Accordingly, all such filter elements described in the prior art have the disadvantage that the membrane becomes discolored (is oxidized) during dry steaming and/or the joining region must be modified in an additional process step during production.

EP 0 096 306 A2, U.S. Pat. Nos. 4,392,958, 4,512,892 and 4,906,371, for example, describe processes for applying strips of plastics material in order to render the porous membrane gas-tight in the joining region/edge region. DE 38 033 41 A1 describes making the edge regions of porous membranes into a film by the action of solvents, solvent vapor or heat, as a result of which the membranes so treated become gas-tight in the regions which have been made into a film. U.S. Pat. No. 5,846,421 describes porous membranes which are filled up with high molecular weight compounds in the region of the melt join in order to achieve gas tightness. It is a common feature of all these methods that the membrane is modified in the joining region by an additional process step to ensure gas tightness, in order to ensure that a subsequent integrity test is passed even when the membrane has changed in terms of material properties (for example changed wettability) in the edge region—induced by the joining process.

The following documents describe methods of modifying the membrane surface in the joining region, wherein, in contrast to the methods described above, these methods are characterized in that the membrane remains permeable in the joining region: EP 571 871 B1 discloses poly(ether)sulfone membranes having a crosslinked polyvinylpyrrolidone (PVP) coating: Before or after the poly(ether)sulfone base membrane is dried, it is passed through an impregnating bath which comprises PVP, vinylpyrrolidone monomers and further hydrophobic monomers. An inorganic peroxosulfate is used as the radical initiator for the PVP crosslinking. After drying, the membranes are completely and spontaneously wettable with water and withstand, for example, steaming at 134° C. and 2 bar for 1.5 to 2.5 hours without losing their spontaneous wettability with water. That spontaneous wettability is necessarily linked to the presence of hydrophobic monomers in the impregnating bath during production. However, it is not disclosed that a dry steamed filter cartridge which comprises a membrane as described in EP 0 571 871 B1 can be tested after minimal wetting. Only the membrane itself is exposed to the steam. Furthermore, it is known only that membranes known from the prior art that have not experienced a previous thermal load as a result of melt joining can continue to remain hydrophilic.

WO 2004/009201 A2 discloses filter cartridges having polyethersulfone-based membranes that can be tested for integrity in water and in which the regions that are embedded into the polypropylene end caps are provided with a hydrophilic coating that does not compromise the porosity of the membrane. The hydrophilic coating consists of polyethyleneimine, polyvinyl alcohol, BUDGE (1,4-butanediol diglycidyl ether) or polyepichlorohydrin resins with amine groups. Such cartridges are successfully tested for integrity (forward-flow or reverse-bubblepoint test). However, it is not disclosed that a dry steamed filter cartridge which comprises a membrane as described in WO 2004/009201 A2 can be tested after minimal wetting. According to WO 2004/009201 A2, cartridges are not dry steamed before the air diffusion measurement but are merely rinsed and tested. The high thermal load which is exerted by dry steaming is absent in these tests. Furthermore, the selective impregnation of the edge regions of the membrane represents an additional process step, which is expensive.

DE 43 39 810 C1 describes a method for partially modifying porous membranes in the joining region. Membranes of poly(ether)sulfone, which are modified with polyvinylpyrrolidone, are modified in the edge regions with a mixture of polyvinylpyrrolidone (PVP) and a copolymer of polyvinylpyrrolidone (PVP) and vinyl acetate (VA) in such a manner that an increased concentration of crosslinked PVP or PVP-VA copolymer is present in those edge regions. The selective impregnation of the edge regions of the membrane has the result, in the filter cartridges which can be produced therefrom, that the filter cartridges can be tested for their integrity by means of air diffusion measurement (pressure hold test or integrity test). However, it is unlikely that a dry steamed cartridge that comprises a membrane as described in DE 43 39 810 C1 would be testable after minimal wetting, in particular because the coating in the edge region also consists of a thermally unstable PVP-VA copolymer. Furthermore, it is not apparent from DE 43 39 810 C1 what properties the membrane has in the coated edge region, in particular in relation to the permeability of the membrane. The described wetting times of from 10 to 30 minutes and the described wetting volumes are far from meeting the requirements of a wetting time of less than 120 seconds and a wetting fluid volume of less than 1 l/m² of membrane area, as are required for filtration methods with single-use filter elements. Moreover, additional disadvantageous impregnating, rinsing and drying steps are described, which are undesirable.

In summary, therefore, all the known methods have the common feature that an additional working step is necessary in order additionally to modify the membrane in the joining region. The ability to be dry steamed is not disclosed, however.

An alternative sterilization method to the above-mentioned dry steaming of filter elements is sterilization by irradiation, wherein the filter elements are exposed to high-energy radiation, such as beta, gamma or electron beam radiation, whereby contaminating microorganisms are destroyed. Preferably, this method is used for single-use filtration systems in which filter elements are pre-assembled, completely ready to use, as a closed system inside single-use housings with further single-use components, such as hoses, which system is sterilized by irradiation prior to use and, once sterilization has taken place, can be stored until it is used. Because of the closed nature of this system, its generally small size and the inadmissibility of openly handling fluids when using the system, testability of the filter elements must be achieved with minimal amounts of fluids.

Accordingly, the object underlying the present invention is to provide a filter element which is simple to produce and which, after dry steaming or alternatively after sterilization by irradiation and subsequent minimal wetting, that is to say after a rinsing step carried out within a limited period of time, with a limited rinsing volume and at a limited rinsing pressure, can successfully be tested for its integrity and which does not change in terms of its material properties as a result of dry steaming or alternatively as a result of sterilization by irradiation.

The object is achieved by the embodiments of the present invention which are characterized in the claims.

SUMMARY OF THE INVENTION

According to the invention there is provided in particular a melt-joined filter element having improved testability after dry steaming or alternatively after sterilization by irradiation, comprising a housing which comprises a plastics material or a plastics material mixture, and a porous, permanently hydrophilized polymer membrane, wherein the polymer membrane is bonded to the housing by melt joining by a melt joining process, the polymer membrane is not additionally modified in the joining region, and wherein the melting point of the plastics material or of the plastics material mixture of the housing component that is melt joined to the polymer membrane is at least 125° C. lower than the degradation temperature of a hydrophilizing agent with which the polymer membrane is permanently hydrophilized.

According to the invention, the expression "filter element" includes all filtration devices which have the purpose of achieving the separation of substances on the basis of size exclusion or different affinity. Thus, the filter element according to the invention is suitable, for example, for depleting yeast cells or bacteria (sterile filtration), viruses (virus depletion), protein aggregates or other particulate contaminants. According to a preferred embodiment of the present invention, the filter element is a filter cartridge.

"Irradiation" within the meaning of the present invention is understood as being beta, gamma or electron beam radiation.

According to the invention, the expression "improved testability after dry steaming" is understood as meaning that, after dry steaming, the filter element according to the invention can successfully be tested for integrity with a minimal outlay in terms of rinsing (minimal wetting) without the occurrence of degradation of the polymer membrane in the filter element as a result of the dry steaming. "Degradation" is understood according to the invention as meaning any thermally induced oxidative material change, in particular discolorations. According to the invention, the expression "successfully test for integrity" is understood as meaning that an integrity test consisting of a bubblepoint and/or diffusion test yields a positive result. This is the case when the membrane and the bonding thereof into the filter element are free of defects, that is to say do not exhibit pores/faults which do not perform the desired separation of substances by size exclusion/affinity, and the filter element as a whole is wetted completely.

According to the invention, the expression "minimal wetting" is understood as meaning that a filter element or a membrane inside a housing with corresponding pipe connections can be wetted completely with a minimal amount of wetting liquid and a minimal wetting pressure. To that end, a peristaltic pump (hose pump), for example, as is typically employed in pharmaceutical processes with single-use filter elements, with a pressure not exceeding 0.1 bar can be used upstream of the filter element. The wetting time is not more than 120 seconds, and the amount of water is not more than 1 liter/m2 of nominal filter area. The nominal filter area is understood as meaning the filter area of a filter element through which flow effectively takes place. Moreover, a plurality of layers of filter membrane can be arranged one behind the other in the filter element, but in that case only the first layer through which there is a flow counts.

According to the invention, the expression "complete wetting" is understood as meaning that the entire boundary surface which separates the non-filtrate side of the filter element from the filtrate side of the filter element is either impermeable to liquid or is filled with test liquid. The boundary surface that is impermeable to liquid includes, for example, the end caps of the filter element, which are made from solid plastics material. The regions of the boundary surface that are filled with test liquid include predominantly all the pores of the embedded membrane structure, but also any voids which might remain upon joining the membrane into the filter element. When there is complete wetting, a bubblepoint test and/or diffusion test is not falsely negatively affected by gas that remains in the boundary surface separating the non-filtrate side of the filter element from the filtrate side of the filter element. This means that higher bubblepoint pressures or a lower diffusion flow are/is not measured after more intensive wetting, for example by preceding steps such as the application of heat (e.g. autoclaving) or wetting with liquids with lower surface tension (for example alcohol) and after a subsequent integrity test.

An integrity test is understood as meaning, for example, that the integrity of the filter element is tested by determining the bubblepoint or the level of gas diffusion (pressure hold test) at a given test pressure (DIN 58356-2:08/2000, DIN 58355-2) below the bubblepoint. The bubblepoint is the bubblepoint or gas diffusion at a given pressure (DIN 58356-2:08/2000, DIN 58355-2). An integrity test consisting of a bubblepoint and diffusion test can be performed, for example, as described in the examples.

According to the invention, the expression "porous polymer membrane" is understood as meaning a porous structure which has a mean pore size (mean-flow pore size) in the range of from 0.001 to 10 µm, preferably from 0.01 to 5 µm, most preferably from 0.1 to 1 µm. The mean-flow pore size is the pore size of a membrane below which 50% of the gas flow occurs through pores<mean-flow pore size. The mean-flow pore size can be measured, for example, in accordance with ASTM F316 03 (2011) ("Standard Test Methods for Pore Size Characteristics of Membrane Filters by Bubble Point and Mean Flow Pore Test").

There are no limitations as regards the material of the polymer membrane in the filter element according to the invention. According to a preferred embodiment, the polymer membrane comprises at least one plastics material selected from the group consisting of polysulfone, polyethersulfone, cellulose acetate, cellulose nitrate, polyvinylidene fluoride, polypropylene, polyethylene, polytetrafluoroethylene, polyamide and copolymers thereof, as well as mixtures thereof. Corresponding membranes are known in the prior art. According to a particularly preferred embodiment, the membrane comprises polyethersulfone.

There are no limitations as regards the thickness of the polymer membrane in the filter element according to the invention. According to an embodiment, the thickness of the polymer membrane is in the range of from 5 to 500 μm, more preferably in the range of from 50 to 300 μm, and most preferably in the range of from 80 to 200 μm.

The polymer membrane in the filter element according to the invention is a permanently hydrophilized polymer membrane. Within the meaning of the present invention, "hydrophilic" is to be understood as meaning polymer membranes whose surface tension at 20° C. is greater than 72 mN/m, or whose contact angle against water is less than 10°. The contact angle defined within the context of the present invention is the static contact angle in degrees [°] against ultrapure water. The contact angle θ can be determined analogously to ASTM-D5946-09 using a commercial goniometer by applying a drop of ultrapure water (1 to 2 μl) to the surface to be analysed and then evaluating according to equation 1, wherein θ denotes the contact angle, B denotes the half width of the drop, and H denotes the height of the drop. The evaluation can be carried out with the aid of software (for example PG Software from FIBRO system AB).

$$\theta = 2\ \arctan(H/B) \quad \text{(equation 1)}$$

For the practical applications of polymer membranes, it is usually desirable for the membrane to be mechanically stable, thermally and chemically resistant and insoluble in common (organic) solvents. Against this background there are frequently used as membrane materials polymers whose surface properties, such as, for example, hydrophilicity, wettability with water or non-specific binding (e.g. of proteins), do not comply with the requirements for later use and whose surfaces must be chemically or physically modified before they are used for filtration.

The polymer membrane integrated into the filter element according to the invention is therefore a permanently hydrophilized polymer membrane. According to the invention, the expression "permanently hydrophilized" is understood as meaning that the polymer membrane has been modified so that it is permanently hydrophilic, that is to say resistant to mechanical, thermal and chemical action. There are no limitations according to the invention as regards the type and manner of the permanent hydrophilization of the polymer membrane. According to one embodiment of the present invention, the permanent hydrophilization of the polymer membrane is effected by chemical or physical modification of an unmodified polymer membrane with a hydrophilizing agent. Such hydrophilizing agents are known in the prior art.

Thus it is proposed, for example, in U.S. Pat. No. 4,618,533, for the permanent modification of membranes of polymers having hydrophobic surfaces which are a priori unsuitable for certain filtration processes, to impregnate porous, hydrophobic membranes based on poly(ether)sulfone or polyvinylidene fluoride with a solution of a monomer (hydroxyalkyl or aminoalkyl acrylates) and an initiator and then to initiate the polymerization of the monomer by supplying energy, for example by heating (thermal initiation) or UV irradiation (using a photoinitiator). By means of the polymerization there are formed inside the porous matrix long-chained, crosslinked polymer chains which cannot be washed off the membrane and are in some cases even grafted onto the membrane, resulting in a permanent modification.

An alternative to the use of initiators is to initiate the polymerization by means of electron beams. The membrane to be modified is thereby impregnated with a solution which comprises monomers derived from acrylic acid derivatives, and is then exposed to electron beam radiation, which initiates the reaction of the monomers. The described impregnating solutions frequently additionally comprise crosslinkers, that is to say di- or generally poly-functional monomers (see U.S. Pat. No. 4,944,879, EP 1 390 087 B1, EP 1 381 447 B1 and WO 2005/077500 A1) or mixtures of a plurality of monomers and crosslinkers (EP 1 390 087 B1, EP 1 381 447 B1 and U.S. Pat. No. 7,067,058 B2). In addition, variants of thermally induced modification with a homopolymer and a crosslinker (WO 2005/077500 A1) or with an oligomer, with a monomer and optionally with a crosslinker are described, wherein U.S. Pat. No. 6,039,872 discloses hydrophilic membranes which can be produced from a hydrophobic poly(ether)sulfone membrane and a crosslinkable polyalkylene glycol diacrylate and a hydrophilic monoacrylate. DE 10 2009 004 848 B3 discloses microporous membranes to the outer and inner surface of which a crosslinked hydrophilic polymer is fixed by the action of electron beams. JP 2011-156533 A discloses the hydrophilization of polysulfone-based hollow fiber membranes, for example with polyethylene glycol or polyvinylpyrrolidone. By purposive temperature management during production and by choosing a suitable ratio between the average molecular weight of the polysulfone polymer and the polymer chosen for the hydrophilization there are obtained membranes which combine high oxidation resistance with a low binding capacity for hydrophobic proteins.

The housing of the filter element according to the invention comprises a plastics material or a plastics material mixture, wherein the melting point of the plastics material or of the plastics material mixture of the housing component that is melt joined to the polymer membrane is at least 125° C. lower than the degradation temperature of a hydrophilizing agent with which the polymer membrane is permanently hydrophilized. According to one embodiment, the melting point of the plastics material or of the plastics material mixture of the housing component that is melt joined to the polymer membrane is at least 140° C. lower, more preferably at least 155° C. lower, than the degradation temperature of the hydrophilizing agent.

According to an embodiment, the housing comprises at least one plastics material selected from the group consisting of polyolefins, polysulfones, fluorinated or partially fluorinated polymers, polyamides, polyesters and cellulose derivatives, as well as mixtures thereof. According to a particularly preferred embodiment, the housing comprises polypropylene.

In the filter element according to an embodiment of the invention, the polymer membrane is bonded to the housing by melt joining by a melt joining process. According to the invention, the expression "melt join" is understood as meaning the join by which the housing is bonded to the polymer membrane. Such melt joining processes are known in the prior art.

Advantageously, the filter element according to the invention can be dry steamed, does not change in terms of its material properties as a result of the dry steaming or alternatively as a result of sterilization by irradiation, and can be tested for integrity after minimal wetting.

This requirement is met in that the membrane is stable to the thermal load during melt joining or to subsequent dry steaming. The membrane is stable to those thermal loads when all the membrane components that determine the material properties of the membrane are stable to those thermal loads. The membrane properties are determined significantly by the polymer material from which the membrane is produced, or by the hydrophilizing agent, which determines the surface properties of the permanently hydrophilized membrane. Furthermore, the thermal load on the membrane during melt joining is all the lower, the lower the melting point of the filter element housing material.

According to the invention, "melting point of a plastics material or plastics material mixture" is understood as being the melting point determined on the plastics material or plastics material mixture by means of dynamic differential scanning calorimetry (DSC) in accordance with DIN EN ISO 11357-1:2009. Differential scanning calorimetry is carried out, for example, as described in the examples.

As is shown in Table 1, for illustration, typical filter element housing materials have different, exemplary melting point ranges:

TABLE 1

| Material | Melting point range [° C.] |
|---|---|
| Polypropylene (PP) | 140-170 |
| Polysulfone (PSU) | 170-190 |
| Polyvinylidene fluoride (PVDF) | 180-220 |
| Polyamide (PA) | 200-260 |
| Polyethylene terephthalate (PET) | 230-260 |

In technical melt joining processes, however, the melt reaches far higher temperatures than the melting point of the filter element housing material. As can be seen in Table 1, polypropylene as the plastics base material has the most suitable melting point range according to the invention of from 140 to 170° C., because the membrane experiences the lowest thermal load upon joining to this material. Furthermore, polypropylene is also suitable for brief steaming at from 105 to 140° C. In technical melt joining processes, polypropylene actually reaches melting temperatures of approximately from 220 to 300° C. at the time of joining. This difference between the melting point and the melting temperature that is actually reached upon joining in a technical process applies equally to other filter element housing materials and is governed by the technical nature of these processes. In order for the housing component to be joined to be melted to a depth of several millimeters within an economically acceptable period of time, the housing component is heated, at least at the surface, to a significantly higher temperature than the melting point of the filter element housing material. Consequently, in particular the surface of the housing component to be joined that faces the heat radiator will reach a temperature that is significantly above the melting point of the filter element housing material. The membrane embedded into that melt is exposed to these elevated temperatures relative to the melting point. It is further known that polymer melts have a relatively high specific heat capacity, which has the result that cooling of the melt takes place relatively slowly, and the membrane is accordingly subjected to a higher thermal load than in the case of melts with a lower specific heat capacity.

A measure of the thermal stability of a material is the degradation temperature of the material. This is determined, for example, by a dynamic thermogravimetric analysis (TGA) performed in an air atmosphere, in which the weight of the sample is measured as the sample temperature increases. If thermal decomposition begins, the weight of the sample falls. In this manner, materials can be tested with regard to their thermal stability and a degradation temperature can be determined. According to the invention, the expression "degradation temperature" is understood as meaning the temperature in a TGA measurement at which the mass loss (TG %) is equal to 2% and wherein the weight of the sample has thus fallen to 98% of the original weight. The sample is thereby heated at a heating rate of 10 K/min.

It has been shown that a difference between the melting point of the plastics material or plastics material mixture of the housing component and the degradation temperature of the hydrophilizing agent of at least 125° C., preferably at least 140° C., and most preferably at least 155° C., yields advantageous testability results owing to the then greatly reduced thermal load on the hydrophilizing agent in technical processes. The melting point is thereby below the degradation temperature by the indicated difference. If a plastics material or plastics material mixture of the housing component having a higher melting point is to be used, then a hydrophilizing agent which likewise has a higher degradation temperature must be used so that the mentioned temperature difference is maintained. In this manner, a thermal load on the hydrophilizing agent is reduced.

According to the prior art, hydrophilizing agents are either applied directly in the form of a polymer to the membrane surface, or monomeric agents are polymerized in the presence of the membrane and applied thereto.

According to an embodiment, there is used a hydrophilizing agent that is thermally stable, that is to say has a degradation temperature of at least 270° C., preferably at least 295° C. and most preferably at least 315° C. It is thereby ensured that the permanently hydrophilized polymer membrane has suitable thermal stability.

When polymeric hydrophilizing agents are used, the indicated degradation temperature relates to the polymer. When monomeric hydrophilizing agents are used, which are not polymerized until the process of hydrophilization of the membrane, the indicated degradation temperature relates to the polymer that is formed. That polymer is produced by means of the analogous process for the hydrophilization of the membrane, with the difference that the membrane is removed from the process and only the impregnating solution is used.

According to an embodiment, the hydrophilizing agent comprises a polymer, more preferably a water-soluble polymer. According to a particularly preferred embodiment, the hydrophilizing agent is selected from the group consisting of hydroxyalkylcellulose, polyvinylpyrrolidone and poly-2-ethyloxazoline. The hydrophilizing agent is most preferably poly-2-ethyloxazoline.

The permanently hydrophilized membrane that is contained in the filter element according to the invention is not additionally modified in the joining region, apart from the hydrophilization described above. According to the invention, the expression "not additionally modified" is understood as meaning that the permanently hydrophilized membrane is not additionally modified in the joining region either chemically or physically, nor is it additionally modified by auxiliary materials, such as, for example, strips of plastics film, introduced in the joining region. Because the filter element according to the invention, unlike filter elements known in the prior art, does not require such additional modification of the membrane in the joining region owing to the high degradation temperature of the hydrophilizing agent, relative to the melting point of the housing material joined to the membrane, a time-consuming and expensive working step is advantageously saved in the method for producing the filter element according to the invention, as compared with known filter elements.

The present invention further provides a method for producing the filter element according to the invention, comprising the steps of:

providing a porous, permanently hydrophilized polymer membrane;

providing a housing; and melt joining the polymer membrane and the housing in order to bond the polymer membrane to a component of the housing by melt joining;

wherein the polymer membrane is not additionally modified in the joining region, and wherein the melting point of the plastics material or of the plastics material mixture of the housing component that is melt joined to the polymer membrane is at least 125° C. lower than the degradation temperature of a hydrophilizing agent with which the polymer membrane is permanently hydrophilized.

In the first two steps of the method according to the invention, a porous, permanently hydrophilized polymer membrane and a housing, as have already been characterized above, are provided.

In the next step, the polymer membrane and the housing are melt joined to bond the polymer membrane to a component of the housing by melt joining. Such a melt joining step may be carried out by methods known in the prior art.

In the method according to the invention, the polymer membrane is not additionally modified in the joining region. The additional modification step in the joining region which is always necessary in the prior art to ensure the integrity of a filter element is therefore advantageously not required.

The present invention further provides the use of the filter element according to the invention for filtering solutions, for example for sterile filtration or virus depletion.

By means of the combination according to the invention of low-melting filter element housing material and thermally stable polymer membrane which has been permanently hydrophilized with a thermally stable hydrophilizing agent, it is possible to provide a filter element, for example in the form of a filter cartridge, which can advantageously be dry steamed without a change in its material properties and which can be tested for integrity after minimal wetting. On account of these advantageous features, the filter element according to the invention is outstandingly suitable for use in filtrations in the pharmaceutical and biotechnological sector, in which high requirements are made in respect of the stability and sterility of the filter material. In addition, advantageously, in the method for producing the filter element according to the invention, no additional step for modifying the polymer membrane in the joining region is necessary in order to be able successfully to perform a later integrity test, as a result of which the filter element is less expensive to produce than filter elements known hitherto in the prior art.

The present invention is explained in greater detail by means of the following detailed description and non-limiting examples.

BRIEF DESCRIPTION OF THE DRAWING

FIG. 1 shows a thermogram of Aquazol® 5 (poly-2-ethyl-oxazoline, MW: 5,000; CAS No. 25805-17-8).

DETAILED DESCRIPTION

Determination of the melting point of a thermoplastic plastics material or plastics material mixture within the meaning of the present invention by means of DSC:

Dynamic differential scanning calorimetry (DSC) is used to determine the melting point of a thermoplastic plastics material. The determination is carried out on the basis of DIN EN ISO 11357-1:2009.

In the case of crystalline or partially crystalline plastics materials, the melting point is defined as the peak melting temperature Tpm, as described under point 10 of DIN EN ISO 11357-3:2011(E). The determination of Tpm is likewise carried out in accordance with that DIN standard. If the DSC curve of the plastics material has more than one Tpm, the Tpm with the highest value is chosen as the measure of the melting point of the plastics material.

In the case of amorphous or semi-crystalline plastics materials, the melting point is defined as the midpoint temperature Tmg, as described under point 3 of DIN EN ISO 11357-2:1999(E). The determination of Tmg is likewise carried out in accordance with that DIN standard. If the DSC curve of the plastics material has more than one Tmg, the Tmg with the highest value is chosen as the measure of the melting point of the plastics material.

Production of polymers for TGA analysis from monomers which are used for the hydrophilization:

The monomers are used in the same concentration and in the same solvent as in the hydrophilization of the membrane (see Implementation Example 1). The polymerization is then carried out under the same conditions as in the process for hydrophilizing the membrane, but in the absence of the membrane: In particular, the temperature, the oxygen content, the layer thickness, optionally the irradiation intensity or dose and/or the concentration and type of initiator are set or used analogously to the process for producing the membrane.

After the polymerization, the resulting polymeric hydrophilizing agent is washed with the solvent of the impregnating solution and dried at a temperature of 110° C. until a constant weight is reached. The resulting polymer is pulverized and a sample is removed for TGA.

Determination of the degradation temperature of a hydrophilizing agent within the meaning of the present invention by means of TGA:

Dynamic thermogravimetric analysis (TGA) is used to determine the degradation temperature of the hydrophilizing agent. The determination is carried out in accordance with DIN EN ISO 11358:1997. The change in the mass of a sample of the hydrophilizing agent under a flowing air atmosphere in dependence on the temperature increasing at a constant rate of 10 K/min is recorded. Before the TGA measurement, the hydrophilizing agent is pre-dried at 110° C. until a constant mass is reached. As described in the DIN standard, ms is defined as the mass of the sample before heating. The degradation temperature defined according to the invention is the temperature at which the sample mass has lost 2% of its weight, that is to say only 98% of the mass before heating are still present, that is to say sample mass=0.98×ms.

Dry Steaming:

A filter element, for example a 10" filter cartridge, is inserted dry into a stainless steel housing, and the housing is connected to a steam supply. The steam feed is opened, steam flows through the filter element in the housing, and a steam pressure of 2 bar, corresponding to a steam temperature of 134° C., is set by means of a control valve arranged downstream of the housing. A differential pressure between the inlet and outlet of the filter housing of from 0.05 to 0.1 bar is set with the aid of a control system of the steam feed. After 30 minutes, the steam feed is closed and the housing is cooled with ambient air at room temperature until temperatures<30° C. are reached.

Wet Steaming:

Wet steaming corresponds to the steaming procedure of dry steaming but, in a departure, the 10" filter element is wetted with water for 90 seconds before being inserted in the filter housing and is used wet. Because steam is unable to flow through the water-wetted membrane when the steam supply is opened, the steam feed is opened only minimally and the steam is discharged at the filter housing through air outlet valves until the housing and the filter element reach a temperature>100° C. and steam is able to pass through the filter element. At no time does the steam pressure exceed a differential pressure of 0.5 bar between the inlet and the outlet of the housing. The differential pressure when a temperature>100° C. has been reached and the steam thus passes through the filter element is from 0.05 to 0.1 bar.

Integrity Test, Bubblepoint and Diffusion Test:

The integrity test, consisting of a bubblepoint and diffusion test, is performed with a Sartocheck® 3 and Sartocheck® 4 integrity tester (Sartorius Stedim Biotech GmbH). Setting parameters are 3 minutes stabilization time, 3 minutes test time for the diffusion test, and the diffusion test pressure specified by the manufacturer for the corresponding filter element (2.5 bar for filter elements according to the invention described herein).

Porometer:

Measuring instrument PMI, Porous Materials Inc., USA, Capillary Flow Porometer

Commercial Comparative Filter Elements:

The following commercial filter elements were tested for comparison:

Pall, type: Supor EKV 0.2 μm, prod. code: AB1EKV7PH4, Ch. IR7867, (2-layer PES membrane);

Pall, type: Fluorodyne EX EDF 0.2 μm, prod. code: AB1UEDF7PH4, Ch. IR8838, (1 layer each of PES and PVDF membrane);

Pall, type: Fluorodyne II 0.2 μm, Prod. code: AB1DFL7PH4, Ch. IR8255, (2 layers of PVDF membrane);

Millipore: type Durapore 0.22 μm, Prod. code: CVGL7TP3, Ch. F1KA97385, (1 layer of PVDF membrane);

Millipore, type: Express SHC, Prod. code: CHGE01TS3, Ch. C1EA82133, (2 layers of PES membrane);

3M Cuno, type: Cuno 3M Life Assure, PNA020F01BA, Ch. M01812-002, (1 layer of PES membrane).

IMPLEMENTATION EXAMPLES

1. Permanent Hydrophilization of Membranes:

A starting membrane of type 15407 (Sartorius Stedim Biotech GmbH), a sterile filter membrane of polyethersulfone with a mean pore size of 0.2 μm, was wetted with an impregnating solution of the hydrophilizing agent used for permanent hydrophilization (see Table 2 below). In the described examples, the hydrophilizing agent is a polymer. The concentration of hydrophilizing agent in the impregnating solution is in the range of from 0.5 to 6.0 percent by weight, wherein water is used as the solvent. After contacting the membrane with the impregnating solution, the membrane was placed between two polyethylene (PE) films and excess impregnating solution was displaced from the membrane with a roller or was squeezed out between two rubberized rollers. The impregnated membrane was then exposed to electron beam radiation (EC-Lab 400, Crosslinking AB, Sweden), wherein an acceleration voltage of 190 kV and doses of from 25 to 75 kGy were used. The irradiation zone was rendered inert with nitrogen, that is to say oxygen present was displaced by nitrogen. After the irradiation, the membrane was extracted with suitable solvents in order to detach hydrophilizing agent that was not permanently bonded and show the permanency of the hydrophilization. The modified membrane was then dried in a drying cabinet and tested for its properties.

TABLE 2

| Abbreviation | Name, CAS No., Molecular weight MW | Polymer concentration in the impregnating solution | Irradiation dose |
|---|---|---|---|
| PVP | Polyvinyl-pyrrolidone, 9003-39-8, 50,000 | 1.3% by weight | 50 kGy |
| POZ | Poly-2-ethyl-oxazoline, 25805-17-8, 5,000 | 0.5% by weight | 75 kGy |
| PEG | Polyethylene glycol, 25322-68-3, 4,000 | 0.7% by weight | 70 kGy |
| PVP-VA (VA: vinyl acetate) 630S | Polyvinylpyrrolidone-co-vinyl acetate S630 25086-89-9, 51,000 | 1.0% by weight | 50 kGy |

2. Thermoanalytical Tests on Polymers (TGA):

The tests were carried out by means of the simultaneous thermoanalyser STA 449 F3 "Jupiter" (Netzsch-Gerätebau GmbH) under a flowing air atmosphere with a heating rate of 10 K/min. The polymers were pre-dried at 110° C. The analysed temperature range was from 10 to at least 500° C. The analysis was carried out and the results were evaluated in accordance with DIN EN ISO 11358. In order to compare different polymers, the degradation temperature was defined as the temperature at which the mass loss is equal to 2%. The data of the TGA for Aquazol® 5 (poly-2-ethyloxazoline, MW 5,000; CAS No. 25805-17-8) are illustrated by way of example (FIG. 1).

TABLE 3

Degradation temperatures of the hydrophilizing agents used in the examples

| Abbreviation | Name, CAS No., Molecular weight MW | Degradation temperature |
|---|---|---|
| POZ | Poly-2-ethyloxazoline, 25805-17-8, 5,000 | 328° C. |
| PVP | Polyvinylpyrrolidone, 9003-39-8, 50,000 | 300° C. |
| PEG | Polyethylene glycol, 25322-68-3, 4,000 | 275° C. |
| PVP-VA 630S | Polyvinylpyrrolidone-co-vinyl acetate S630, 25086-89-9, 51,000 | 250° C. |

3. Construction of Filter Elements by the Melt Joining Process

The construction of filter elements is carried out by pleating a membrane permanently hydrophilized according to Implementation Example 1 with POZ, PVP, PEG or PVP-VA. A polypropylene spunbonded fabric is thereby arranged above and below the permanently hydrophilized membrane on a knife pleating machine. The pleated membrane composite is arranged in a 10" polypropylene outer and inner housing (Sartorius Stedim Biotech GmbH). Polypropylene end caps having a melting point Tpm, measured by means of DSC (see "General methods"), of 166° C. are melted and fitted. To that end, a metal block is heated to a temperature which is above the melting point of the housing components used for the melt joining, and positioned 8 to 12 mm in front of the end caps for 60 seconds in order to produce the melt. The membrane composite with the inner and outer housing is then inserted into the polymer melt. The protecting cap and connection adapter are then joined by melting on both sides and joining the end caps and the connection components of polypropylene. The finished cartridges undergo a rinsing step with water of 90 seconds, autoclaving at 134° C. for 30 minutes, rinsing (again) in the same manner, an integrity test, and drying for 12 hours at 80° C. in a convection drying cabinet.

4. Integrity Test on Filter Elements after Dry and Wet Steaming

Table 4 compares the results of an integrity test on commercial filter elements with filter elements according to the invention after dry steaming. Filter elements are known which do not pass the integrity test after dry steaming (134° C., 30 minutes) with subsequent minimal wetting on account of insufficient wetting.

TABLE 4

Integrity test after dry steaming

| Product, Prod. code, Lot. No | Diffusion/Limit value [ml/min] | Bubblepoint/ Limit value [bar] | Integrity test passed |
|---|---|---|---|
| commercial filter elements | | | |
| Millipore Express SHC, CHGE71TS3, Ch. C1EA82133 | 18.4/<28.2 | 5.44/>4.0 | yes |
| Millipore Durapore ®, CVGL71TP3, Ch. F1KA97385 | 12/<13.3 | 3.36/>3.45 | no |

TABLE 4-continued

Integrity test after dry steaming

| Product, Prod. code, Lot. No | Diffusion/Limit value [ml/min] | Bubblepoint/ Limit value [bar] | Integrity test passed |
|---|---|---|---|
| Pall Supor ® EKV, AB1EKV7PH4, Ch. IR7867 | 168/<17 | 3.29/>3.2 | no |
| Pall Fluorodyne ® EX EDF, AB1UEDF7PH4, Ch. IR8838 | 42.5/<30 | 3.44/>3.2 | no |
| Pall Fluorodyne ® II, AB1DFL7PH4, Ch. IR8255 | 16.2/<12 | 3.23/>3.2 | no |
| Cuno 3M Life Assure, PNA020F01BA, Ch. M01812-002 | n.d./<51 | n.d./>3.2 | no |
| filter elements according to the invention | | | |
| Element according to the invention PES/POZ, 10", Ch. 11022083 (membrane according to Table 2) | 16.8/<25 | 4.03/>3.5 | yes |
| Element according to the invention PES/PVP, 10", Ch. 120008583 (membrane according to Table 2) | 12.5/<13 | 4.15/>3.5 | yes |
| comparative examples of filter elements not according to the invention | | | |
| Comparative example: Element PES/PEG, 10", Ch. 09005883 (membrane according to Table 2) | 16.1/<13 | 3.81/>3.5 | no |
| Comparative example: Element PES/PVP-VA, 10", Ch. 09011983 (membrane according to Table 2) | 17.4/<13 | 3.90/>3.5 | no |

By comparison, filter elements successfully pass the integrity test after wet steaming (134° C., 30 minutes) with subsequent minimal wetting (Table 5):

TABLE 5

Integrity test after wet steaming

| Product, Prod. code, Lot. No | Diffusion/Limit value [ml/min] | Bubblepoint/ Limit value [bar] | Integrity test passed |
|---|---|---|---|
| commercial filter elements | | | |
| Millipore Express SHC, CHGE71TS3, Ch. C1EA82133 | 17.5/<28.2 | 5.5/>4.0 | yes |
| Millipore Durapore ®, CVGL71TP3, Ch. F1KA97385 | 10.8/<13.3 | 3.29/>3.45 | no |
| Pall Supor ® EKV, AB1EKV7PH4, Ch. IR7867 | 13.5/<17 | 3.45/>3.2 | yes |
| Pall Fluorodyne ® EX EDF, AB1UEDF7PH4, Ch. IR8838 | 23.3/<30 | 4.38/>3.2 | yes |
| Pall Fluorodyne ® II, AB1DFL7PH4, Ch. IR8255 | 10.3/<12 | 3.88/>3.2 | yes |
| Cuno 3M Life Assure, PNA020F01BA, Ch. M01812-002 | 43.3/<51 | 4.54/>3.2 | yes |

TABLE 5-continued

Integrity test after wet steaming

| Product, Prod. code, Lot. No | Diffusion/Limit value [ml/min] | Bubblepoint/ Limit value [bar] | Integrity test passed |
|---|---|---|---|
| filter elements according to the invention | | | |
| Element according to the invention PES/POZ, 10", Ch. 11022083 (membrane according to Table 2) | 18.1/<25 | 3.83/>3.5 | yes |
| Element according to the invention PES/PVP, 10", Ch. 120008583 (membrane according to Table 2) | 12.7/<17 | 3.95/>3.5 | yes |
| comparative examples of filter elements not according to the invention | | | |
| Comparative example: Element PES/PEG, 10", Ch. 09005883 (membrane according to Table 2) | 11.1/<13 | 4.47/>3.5 | yes |
| Comparative example: Element PES/PVP-VA, 10", Ch. 09011983 (membrane according to Table 2) | 10.4/<13 | 4.05/>3.5 | yes |

Millipore-Express-SHC filter elements are manufactured with film strips as auxiliary agent in the cap sealing region and do not meet the above requirements. Millipore-Durapore® filter elements exhibit in principle, that is to say even in the case of wet steaming or in the case of non-minimal wetting, bubblepoint values which are too low and therefore do not meet the requirements. Pall-Fluorodyne®-II- and -EX filter elements exhibit degradation under the applied thermal loads and do not meet the requirements. The microfiltration membranes contained in those products discolor/oxidize as a result of the steaming (see Implementation Example 6).

The diffusion results of the integrity test can be shown in dependence on the degradation temperature. The lower the degradation temperature of the hydrophilizing agent, the greater the damage to the hydrophilization upon thermal joining during production of the filter element. There are accordingly formed larger, non-wettable membrane regions and consequently greater diffusion currents, the greater the damage, that is to say the lower the degradation temperature. There is thus obtained a sequence of falling degradation temperatures relative to increasing diffusion values, normalized to the nominal filter area:

| | Temperature: | | | |
|---|---|---|---|---|
| | 328 | 300 | 275 | 250° C. |
| Diffusion value: | 16.8 | 20.8 | 26.8 | 29 ml/min/m², | which is shown in Table 6 with assignment to the further data.

TABLE 6

Integrity test after dry steaming and diffusion result relative to degradation temperature of the hydrophilizing agent

| Product, Prod. code, Lot. No | Diffusion [ml/min/m²] mean per charge | Integrity test passed | Degradation temperature |
|---|---|---|---|
| filter elements according to the invention | | | |
| Element according to the invention PES/POZ, 10", Ch. 11022083 (membrane according to Table 2) | 16.8 | yes | 328° C. |
| Element according to the invention PES/PVP, 10", Ch. 120008583 (membrane according to Table 2) | 20.8 | yes | 300° C. |
| comparative examples of filter elements not according to the invention | | | |
| Comparative example: Element PES/PEG, 10", Ch. 09005883 (membrane according to Table 2) | 26.8 | no | 275° C. |
| Comparative example: Element PES/PVP-VA, 10", Ch. 09011983 (membrane according to Table 2) | 29 | no | 250° C. |

5. Degradation/Discoloration of the Membranes of Filter Elements after Heat Treatment For the product Durapore® 0.22 μm, degradation, visible by the brownish discoloration of the polymer membrane, is noted. For the product Fluorodyne® II and Fluorodyne® EX EDF, degradation, visible by the brownish discoloration of the polymer membrane, is likewise noted.

Measurement of the discoloration is carried out using a D186 reflection densitometer, Greteg, Althardstr. 70, CH-8105 Regensdorf.

The membrane material is removed from a filter element in the delivery state and from a filter element which has been subjected to dry steaming. The D186 densitometer is calibrated with the calibration color chart provided. All the membranes were wetted and lie flat on the same PP base plate, so that the measuring instrument can be placed flat on the membrane and measured. Calibration for the color yellow is 1.48 units. The results of the measurement of the yellow component are given in the following:

Sample 1: Fluorodyne® II, 10" cartridge, main filter membrane, material as stated

| Starting membrane | after dry steaming |
|---|---|
| 0.42 | 0.63 |
| 0.42 | 0.62 |
| 0.44 | 0.62 |

After heat treatment, the membrane material exhibits a discoloration into the yellow/brown region, indicating thermal oxidative degradation of the membrane material.

Sample 2: Fluorodyne® EX EDF, 10" main filter membrane, material as stated

| Starting membrane | after dry steaming |
|---|---|
| 0.42 | 0.61 |
| 0.44 | 0.62 |

After heat treatment, the membrane material exhibits a discoloration into the yellow/brown region, indicating thermal oxidative degradation of the membrane material.

Sample 3: Durapore® 0.22, 10" membrane, material as stated

| Starting membrane | after dry steaming |
|---|---|
| 0.24 | 0.56 |
| 0.24 | 0.59 |

After heat treatment, the membrane material exhibits a discoloration into the yellow/brown region, indicating thermal oxidative degradation of the membrane material.

Sample 4: Filter element according to the invention PES-POZ, 10" main filter membrane

| Starting membrane | after dry steaming |
|---|---|
| 0 | 0 |
| 0 | 0 |
| 0 | 0 |

After heat treatment, the membrane material does not exhibit discoloration into the yellow/brown region. There is no indication of thermal oxidative degradation of the membrane material.

Sample 5: Filter element according to the invention PES-PVP, 10" main filter membrane

| Starting membrane | after dry steaming |
|---|---|
| 0 | 0 |
| 0 | 0 |
| 0 | 0 |

After heat treatment, the membrane material does not exhibit discoloration into the yellow/brown region. There is no indication of thermal oxidative degradation of the membrane material.

The invention claimed is:

1. A melt-joined filter element with improved testability after dry steaming or after sterilization by irradiation, the filter element comprising
   a porous, permanently hydrophilized polymer membrane that has been permanently hydrophilized by a hydrophilizing agent so that a surface tension of the membrane at 20° C. is greater than 72 mN/m, the hydrophilizing agent having a specified degradation temperature; and
   a housing formed from polypropylene having a melting point that is at least 125° C. lower than the degradation temperature of the hydrophilizing agent with which the polymer membrane is permanently hydrophilized, wherein
   the polymer membrane is bonded to the housing by melt joining by a melt joining process without a degradation of the hydrophilizing agent in a melt joining region to the housing due to the difference between the melting point of the polypropylene of the housing and the degradation temperature of the hydrophilizing agent, and wherein
   strips of plastics film are not introduced in the melt joining region, and wherein
   the hydrophilizing agent is poly-2-ethyloxazoline and the polymer membrane comprises polyethersulfone.

2. The filter element of claim 1, wherein the permanent hydrophilization of the polymer membrane is effected by chemical or physical modification of an unmodified polymer membrane with the hydrophilizing agent.

3. The filter element of claim 2, wherein the melting point of the polypropylene is at least 140° C. lower than the degradation temperature of the hydrophilizing agent.

4. The filter element of claim 2, wherein the hydrophilizing agent has a degradation temperature of at least 270° C.

* * * * *